Figure 1:
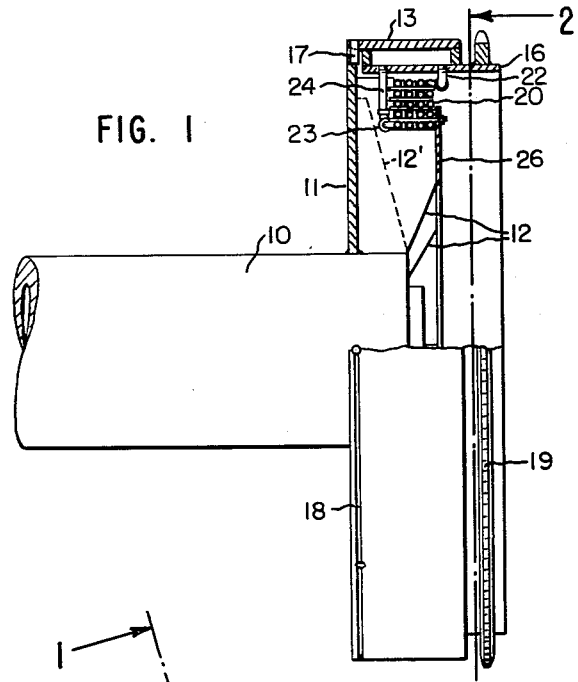

Oct. 31, 1961 A. H. WILKINSON 3,006,442
TEMPERATURE-CONTROLLED BRAKE SYSTEM
Filed Nov. 19, 1958 2 Sheets-Sheet 1

INVENTOR.
Alvin H. Wilkinson
BY
Kenway, Jenney, Witter & Hildreth
Attys.

INVENTOR.
Alvin H. Wilkinson
BY
Kenway, Jenney, Witter & Hildreth
Att'ys.

United States Patent Office 3,006,442
Patented Oct. 31, 1961

3,006,442
TEMPERATURE-CONTROLLED BRAKE SYSTEM
Alvin H. Wilkinson, Talala, Okla., assignor to Cabot Corporation, Boston, Mass., a corporation of Delaware
Filed Nov. 19, 1958, Ser. No. 775,053
2 Claims. (Cl. 188—264)

This invention comprises a new and improved temperature-controlled brake system for hoisting and lowering heavy loads through substantial distances or at high speed with the incident development of frictional heat which, if uncontrolled, may lead to dangerous failure or impairment of the whole system.

It has been the common practice to use a hoisting drum on which a cable is wound and unwound in operations of hoisting or lowering a load, for example in the oil field. An engine or motor furnishes the energy to drive the drum while hoisting, and while lowering the load energy is developed in proportion to the distance traveled by the load. The hoisting drum is usually provided with a brake rim engaged by a brake band which is tightened to hold or regulate the rate of descent of the load. The energy developed by the descending load is converted into heat which must be absorbed or dissipated by the braking system. In apparatus heretofore available the heat generated has caused reaction that is detrimental to the efficiency and life of the braking system; for example, heat absorbed by the brake rim causes the rim to expand or to tend powerfully to expand. If the rim is restrained so that free expansion is not permitted, the rim will become distorted and the effectiveness of the brake seriously decreased. Further, the coefficient of friction of the acting brake material is decreased as the temperature of the rubbing surface rises. If the heat being generated is not removed from the system the temperature will rise until the effectiveness of the brake is impaired for this reason.

The object of the present invention is to obviate these difficulties and provide a temperature-controlled brake system in which the brake rim is so constructed and arranged that it may expand freely and retain its circular contour throughout the full range of operating temperature. The invention also contemplates providing a built-in cooling coil carried by the rim and connected so that vaporized fluid and condensed fluid may be interchanged between the two thus definitely placing a top limit to the temperature that can be reached by the rim in operation.

As herein shown the brake rim is attached to the rotary drum by radially disposed pins in one member loosely fitting within radially disposed bores in the other member.

Temperature control of the brake rim is effected in the system as herein illustrated by enclosing within the rim a circumferential chamber for cooling fluid which is in communication with a circumferential coil carried by the rim and having connections by which vapor generated in the chamber flows to the coil wherein it is condensed and recirculated to the cooling chamber.

Figure 2:
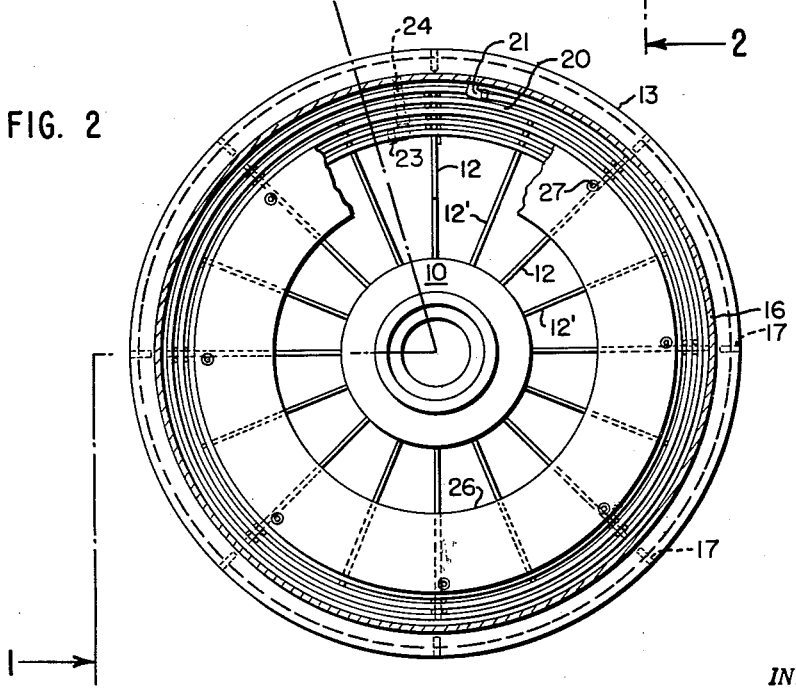
Figure 3:
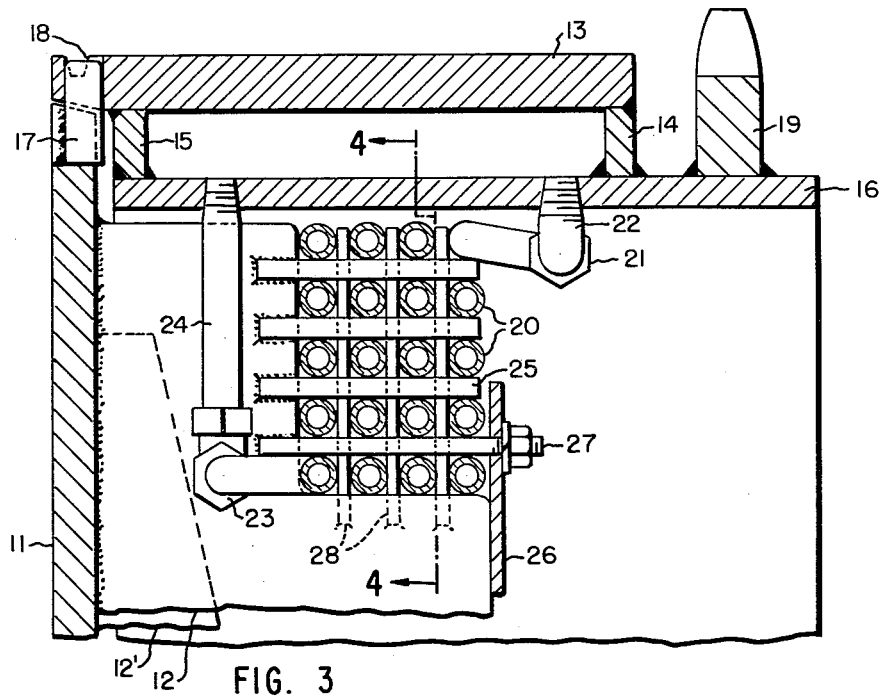
Figure 5:
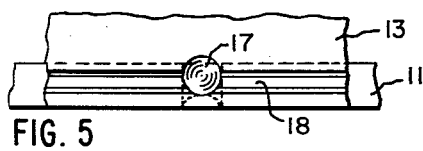
Figure 6:
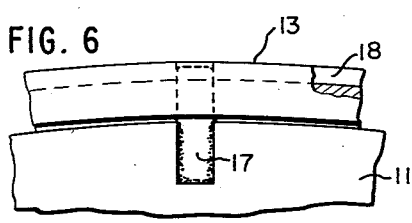
Figure 4:
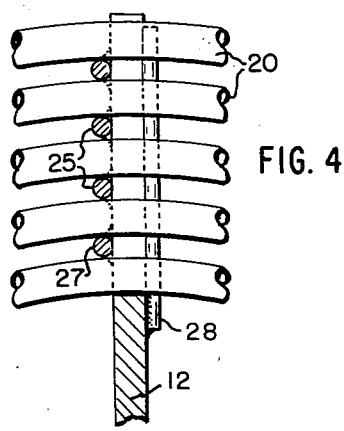

These and other features of the invention will be best understood and appreciated from the following description of a preferred embodiment thereof selected for purposes of illustration and shown in the accompanying drawings in which:

FIG. 1 is a view in elevation, partly in section on the line 1—1 of FIG. 2, showing one end of the hoisting drum with the brake rim and cooling means, FIG. 2 is an end view of the system on the line 2—2 of FIG. 1, FIG. 3 is a fragmentary sectional view on an enlarged scale, FIG. 4 is a fragmentary view of the cooling coil, and FIGS. 5 and 6 are fragmentary views illustrating the expansion joint in the mounting of the brake rim.

The hoisting drum 10 upon which the cable is wound in practice is provided at one end with a circular web 11 reinforced by radial ribs or vanes 12 and 12'. The ribs 12 are cut away or notched at their outer ends to provide rectangular spaces for the cooling coils as will presently appear, while the ribs 12' which alternate with the ribs 12 are triangular in contour and shaped to clear the cooling coil. The cylindrical brake rim 13 which in practice is engaged by the brake band or friction shoe, is provided with inwardly directed side walls 14 and 15 welded at their outer ends to the rim 13 and at their inner ends to the cylindrical wall 16 of the drum 10 and together forming a circumferential cooling chamber, shallow in height, rectangular in cross section, and underlying the rim 13 throughout its whole circumference. A ring 19 of sprocket teeth is shown as welded to the cylindrical wall 16 adjacent its outer end.

The rim 13 is connected to the circular web 11 by means of an expansion joint which permits free expansion of the rim 13 regardless of its temperature and thus insures maintenance of its true circular braking surface. As herein shown this connection comprises a series of radial pins 17 which, as best shown in FIG. 3, are welded in place so that they project beyond the outer edge of the web and fit loosely into corresponding radial bores formed in the left hand edge of the rim 13 as seen in FIG. 3. These bores are located in a circular groove 18 extending continuously about the rim 13 adjacent to its left hand edge. It is of course of secondary importance to which member the pin 17 is secured and in which the corresponding bores are formed. In the illustrated embodiment of the invention eight driving pins 17 are provided. These are spaced evenly about the circumference of the rim as shown in FIG. 2.

The cooling coil 20 herein shown comprises eighteen or more endless turns and is mounted within the cylindrical wall 16 of the drum immediately beneath the cooling chamber that is located between the wall 16 and the rim 13. The turns are shown as arranged in five banks of progressively greater distance from the axis of rotation. One end of the coil is connected from the outer bank of turns through an adaptor elbow 21 and short inlet nipple 22 to the right hand side of the cooling chamber, while the other end of the coil is connected from its inner end through an adaptor elbow 23 and long nipple 24 to the cooling chamber at a point adjacent its left hand end. The cooling coil is held in position by spacing pins 25 set in the ribs 12 as shown in FIG. 3 and a segmental side plate 26 which is secured in place by threaded pins 27 set in the ribs 12 below the spacer pins 25. The elbows 21 and 23 are so arranged as to provide flexible inlet and outlet connections between the coil carried by the ribs 12 and 12' and the inner wall 16 of the drum that forms the cooling chamber which may be subject to slight movement with respect to the coil due to expansion.

In operation a limited supply of water or other cooling fluid is placed in the chamber beneath the rim 13. While the drum is rotating the liquid will be maintained as a film on the inner surface of the rim 13. Frictional heat generated by rotation of the rim will convert the liquid into vapor thus creating pressure in the closed system. The vapor will flow under pressure out through the nipple 24 to the coil 20 where it will be condensed to liquid again as it gives off heat to the coil. The condensed liquid will flow radially outwardly through the nipple 22 due to centrifugal force developed in the water of condensation and this flow will also be aided by the auger effect of the spirally wound coil. The condensate will return to the cooling chamber thus completing the cooling cycle. The centrifugal forces developed in the outer turns of the coil will cause the liquid to seek the nearest outlet through the short nipple 22 to the cooling chamber.

During rotation of the drum the ribs 12 and 12' will serve as vanes or fan blades causing air to flow around the turns of the coil and thus conduct heat away from it. The side plate 26 directs the circulation created by the ribs 12 and 12' through the turns of the coil.

It has been found that in operation hoisting drums equipped as above described heat generated by the braking action is transferred from the rim faster than this can be done by radiation alone or conduction. The fluid is retained in the closed system and in practice no replenishing of it has been found necessary. The formation of scale which is prevalent in open type systems where evaporation occurs is entirely eliminated in the closed system herein described. A fluid of low freezing point can be used thus eliminating freezing hazards otherwise encountered, and an important advantage of economy arises from the fact that a small amount of anti-freeze solution is required as compared to that required in open circulating systems. The system is extremely compact and an important saving in space and weight is realized in comparison with other known systems. Also since free expansion of the rim is permitted the life of this element is indefinitely prolonged and its concentricity maintained.

A satisfactory anti-freeze solution is that known as "Dowtherm" and is readily available on the market and which has a high boiling point and a low freezing point. The boiling point is such that excessive vapour pressure will not be created at the temperatures reached in the operation of the brake run. However, a relief valve may be included in the system as an extra precaution.

Having thus disclosed my invention and described in detail an illustrative embodiment thereof, I claim as new and desire to secure by Letters Patent:

1. A temperature-controlled brake system, comprising a rotatable drum, a cylindrical brake rim mounted on said drum, a concentric inner wall attached to said rim and defining therewith a circumferential cooling chamber adapted to contain a limited quantity of cooling liquid, a spirally formed coil concentrically mounted with respect to said rim and rotatable therewith, said coil being arranged in several banks disposed at progressively increasing distances from the axis of rotation and communicating with said chamber by means of inlet and outlet connections arranged in spaced relation to one another, said chamber and said coil constituting a closed system wherein liquid within said chamber is vaporized by frictional heat generated at the rim and thereby forced through said inlet connection to said coil where the vaporized liquid is condensed and returned to said chamber through said outlet connection by centrifugal force produced in the outer turns of the coil by the rotation thereof.

2. A temperature-controlled brake system as defined in claim 1, further characterized in that the turns of the coil farthest away from the axis of rotation have a short connection and the turns of the coil nearest to the axis have a long connection with the cooling chamber.

References Cited in the file of this patent

UNITED STATES PATENTS

| | | |
|---|---|---|
| 1,038,092 | Craig | Sept. 10, 1912 |
| 1,487,353 | Nolte | Mar. 18, 1924 |
| 1,559,301 | Barnard | Oct. 27, 1925 |
| 1,743,409 | Tracy | Jan. 14, 1930 |
| 1,811,090 | Livingston | June 23, 1931 |
| 2,038,188 | Morgan | Apr. 21, 1936 |
| 2,041,457 | Cautley | May 19, 1936 |
| 2,193,377 | Pierce | Mar. 12, 1940 |
| 2,672,954 | Bennett | Mar. 23, 1954 |
| 2,704,656 | Freer | Mar. 22, 1955 |
| 2,724,953 | Justice | Nov. 29, 1955 |

FOREIGN PATENTS

| | | |
|---|---|---|
| 518,164 | France | Dec. 27, 1920 |
| 87,654 | Switzerland | Jan. 3, 1921 |